United States Patent
Staats

[11] 3,836,414
[45] Sept. 17, 1974

[54] METHOD FOR ELIMINATING BUBBLES IN LAMINATES
[75] Inventor: Henry N. Staats, Deerfield, Ill.
[73] Assignee: General Binding Corporation, Northbrook, Ill.
[22] Filed: June 11, 1971
[21] Appl. No.: 152,052

[52] U.S. Cl............... 156/87, 40/2.2, 156/152, 156/249, 156/289, 156/344, 161/232, 161/406
[51] Int. Cl............................................. B32b 31/00
[58] Field of Search............ 156/87, 247, 249, 289, 156/209, 219, 323, 344, 152; 161/232, 406, 146, 148; 117/6, 8, 10; 40/2.2; 264/213

[56] References Cited
UNITED STATES PATENTS

| 3,069,793 | 12/1962 | Francescon | 40/2.2 |
|---|---|---|---|
| 3,279,826 | 10/1966 | Rudershausen et al. | 40/2.2 X |
| 3,434,861 | 3/1969 | Luc | 117/10 |
| 3,505,140 | 4/1970 | Dunn | 156/289 X |
| 3,519,531 | 7/1970 | James et al. | 156/332 X |
| 3,669,827 | 6/1972 | Kolyer | 156/332 X |

FOREIGN PATENTS OR APPLICATIONS

| 585,701 | 10/1959 | Canada | 156/290 |

Primary Examiner—Charles E. Van Horn
Assistant Examiner—David A. Simmons
Attorney, Agent, or Firm—Hill, Gross, Simpson, Van Santen, Steadman, Chiara & Simpson

[57] ABSTRACT

This invention provides a method of producing substantially bubble-free laminates for identification cards, photographs and the like which eliminates randomly disposed entrapped air bubbles heretofore found, which method comprises providing a texture in the heat-sealing surface of the laminate film prior to lamination pressurization with the card.

10 Claims, 4 Drawing Figures

PATENTED SEP 17 1974　　　　　　　　　　3,836,414

INVENTOR.
HENRY N. STAATS

BY _____ ATTORNEYS

METHOD FOR ELIMINATING BUBBLES IN LAMINATES

BACKGROUND OF THE INVENTION

1. Field of the Invention

This invention is related to a process for producing substantially bubble-free plastic laminates for identification cards, photographs and the like.

2. Description of the Prior Art

The use of a polyester film, particularly polyethylene terephthalate (Mylar) in combination with a heat-reactivatable or heat-sealing coating and preferably polyethylene adhesive has been extended quite widely in the past decade as a useful laminating material. This material is in various gauges of film ranging from a heavy gauge to a light gauge and even a microfilm. This material has been used in laminating identification cards, photographs and the like. However, in the lamination of such identification means, there is the problem of randomly disposed entrapped air bubbles which distort and tend to obliterate parts of the photograph or card laminated. Accordingly, these distortions caused by the bubbles tend to alter or at least make unclear the laminated subject matter, as well as lessening the esthetic values of the card and/or photograph laminated.

It is quite desirable to produce plastic film laminates of identification cards in all gauges of film and product combination. As a minimum requirement, this bubble-free characteristic of such laminate is desirable from an esthetic standpoint. In addition, as in the case of an identification card and/or photograph, it is essential that there be no markings or bubbles or deformation on the photograph or identifying information so that it is accurate and complete as well as being esthetic in appearance.

Theoretically, in the processing of these polyethylene laminates, i.e., as the plastic film together with the identification card or photograph to be laminated are passed through a laminating device or apparatus, the adhesive on the laminating film becomes molten and tacky while in contact with the opposing film member and insert. Thus, once the bond or tack is formed between the film and insert and other film member it cannot be undone. Accordingly, any air entrapped or captured between these bond or tack points remains where it is, and perhaps is flattened out over a larger area as the insert and laminating film are processed through the laminating device. This development likely results in the random formation of bubbles on the identification card or photograph and thus an altered or undesired identification card and/or photograph is produced.

It would therefore be a substantial advancement in the art if a laminating process were developed which provides laminated film identification cards and/or photographs which are substantially free of bubble formation thereon. The bubble-free characteristics of such laminated identification cards and/or photographs would obviate any distortion or alteration of the photograph and/or identifying information of the person for whom the laminate is made.

SUMMARY OF THE INVENTION

In view of the above, a new method of laminating films to identification cards and/or photographs has been provided whereby the formation of bubbles on the resulting laminate has been overcome. Substantially bubble-free laminates are produced by means of this process by first texturizing the heat-sealing surface of a laminating film which has been folded in half into an envelope of top and bottom films. After the heat-sealing surfaces of the envelope films have been texturized, the identification card and/or photograph is inserted in the envelope in between such treated films and in contact with the texturized heat-sealing surfaces of each film. The laminating process is then completed in the conventional manner by the application of heat and pressure to the films bearing the card and/or photograph.

The invention is also related to an improved laminated identification card from the above process. The substantially bubble-free laminated identification card comprises a card and/or photograph having bonded to both sides thereof a polyethylene terephthalate film, each film having a texturized heat-sealing coating in contact with the card.

It therefore becomes the primary object of the present invention to provide a method of producing substantially bubble-free film laminates of identification cards, photographs and the like.

Another object of the invention is to provide substantially bubble-free film-laminated identification cards and/or photographs simply and economically with small conventional laminating apparatuses.

Other objects, features and advantages of the present invention will be readily apparent from the following description of certain preferred embodiments thereof taken in conjunction with the accompanying drawings, although variations and modifications may be effected without departing from the spirit and scope of the novel concepts of the disclosure.

DESCRIPTION OF THE PREFERRED EMBODIMENTS

Figure 1:
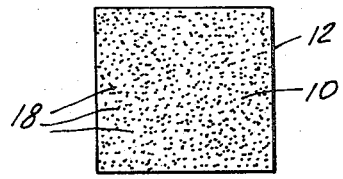
FIG. 1 illustrates an untreated heat-sealing surface of a plastic laminating film.

Referring to FIG. 1, a blown-up view is shown of a heat-sealing surface 10 of a plastic or polyethylene terephthalate film 12. The surface 10 is an untreated layer of a plastic adhesive material such as polyethylene, a copolymer of polyethylene, or other suitable thermoplastic resin. As can be seen the adhesive material is spread at random all over the surface 10 of the film 12 at various points and positions 18. It can be seen that when heat is applied to the film that it will bond to or become attached at these various points and positions 18. And accordingly, any air that may be between these tack or bond points will become entrapped therein and likely spread out upon any pressure being applied to the film in, for example, a laminating device.

According to the present invention, this adhesive or heat-sealing surface 10 of film 12 is to be treated and texurized so that the surface 10 will have a different texture, i.e., pattern, wherein air may not be entrapped inbetween the tack or bond points of the film with the insert of a laminate and/or other film of the laminate to form undesirable bubbles.

Figure 2:
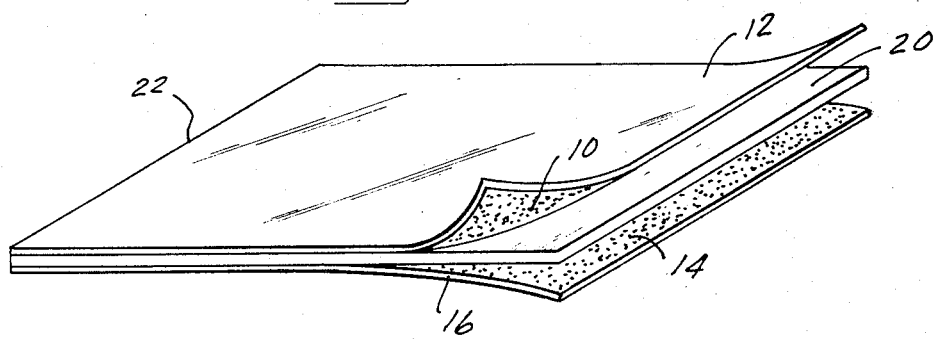
FIG. 2 is a schematic view of a plastic laminating film envelope having inserted therein a release paper.

In FIG. 2, there is illustrated a means of texturizing heat-sealing surfaces according to the present invention. As shown, a sheet of release paper 20 is inserted in a polyethylene terephthalate envelope 22 inbetween the top and bottom films 12 and 16 of the envelope. The films 12 and 16 have heat-sealing surfaces 10 and 14, respectively, which are both in contact with the release paper 20, one on each side. After the release paper 20 has been inserted in the envelope 22 inbetween films 12 and 16, a sufficient amount of pressure is applied to the assembly of materials to impress the texture of the release paper 20 into the adhesive surfaces 10, 14 of the respective films 12, 16. The pressure may be applied by any suitable means, for example, by passing the assembly of materials inbetween pressure rollers (not shown).

Heat may be applied to the assembly of materials in combination with the pressure, such as in the laminating device in which the identification card is to be laminated to the films. After the assembly has been processed, the release paper 20 is removed from the envelope 22. As a result of such treatment, the adhesive surfaces 10 and 14 are texturized. That is, by the application of pressure alone or in combination with heat to the assembly of films 12, 16 and release paper 20, the texture of the heat-sealing surfaces 10 and 14 has been changed to correspond to the texture of the release paper 20.

The release paper that may be used according to the present invention is that paper made available as "35-pound Sheets Silicone-Treated Premium Release Paper," by Brown Company of Kalamazoo, Mich.

Figure 3:
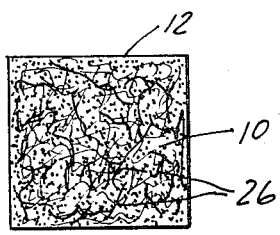
FIG. 3 illustrates a heat-sealing surface of a laminating film treated according to the present invention.

The texture impressed on and into the heat-sealing surfaces is illustrated in FIG. 3 with respect to film 12 and surface 10. As can be seen, in comparison with that shown in FIG. 1, instead of having spots or blots of adhesive at random, the adhesive surface 10 has a pattern of pathways 26 formed and impressed therein. With this arrangement, it can be seen that any air that may be in these pathways 26 in between the insert and laminating film will not be entrapped into large bubbles or spread out over a larger area upon the application of pressure by a laminating device. Instead, the air present will be dispersed and even removed by way of these pathways 26 formed in the heat-sealing surfaces of the film.

Subsequent to the removal of the release paper 20 from the envelope 22, an identification card and/or photograph may be inserted in the envelope and in between the two films 12 and 16. Then heat and pressure is applied, in a sufficient amount, to the assembly of films 12, 16 and card whereby the films are laminated, respectively, to opposite sides of the card and/or photograph. The lamination of the identification card can be performed with a small laminator such as "MINI-LAM MODEL No. 252" of General Binding Corporation, of Northbrook, Ill.

Figure 4:
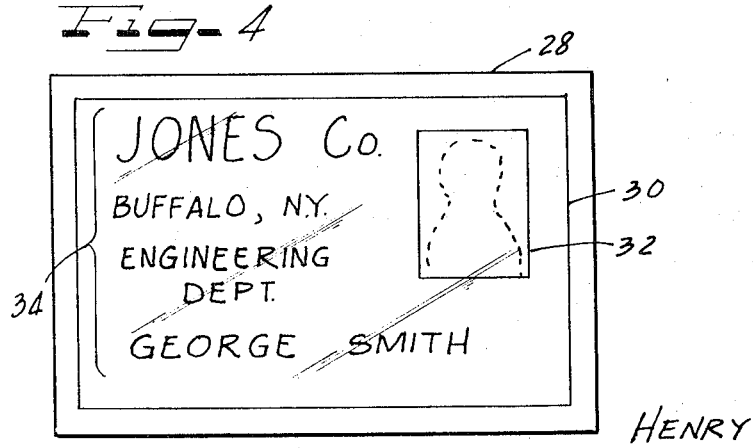
FIG. 4 illustrates a laminated card provided by the present invention.

The resulting laminated card 28 as illustrated in FIG. 4, is substantially free of any bubbles formed on the identification card and/or photograph. The resulting laminate is a monolithic card comprised of two polyethylene terephthalate films each of which has a texturized adhesive surface and is laminated to an opposite side of an insert or identification card 30 having a photograph 32 inserted therein, and personal identifying indicia 34 printed on its surface.

The bubbles, if any, that may be formed in the laminate are so small and diversely distributed that they cannot be seen by the naked eye and can only be seen under a high powered magnification. Accordingly, the esthetic characteristics of the resulting identification card, as well as the more important identifying information of the card is not effected nor altered to be inaccurate or incomplete, and the card is very suitable for commercial and legal use.

As indicated above, any suitable thermoplastic resin may be combined with polyethylene terephthalate film to constitute a laminating film for an identification card. Included within the definition of suitable thermoplastic resins are hydrocarbon polymers such as polyethylene, other polyolefins and copolymers of ethylene with 1-olefins, polystyrene, polyvinyl halides, polyvinylidene halides, polyacrylates, including inter alia polymethylmethacrylate, linear polycarbonamides made by the intermolecular polymerization of linear diamines containing from six to ten carbon atoms with linear dicarboxylic acids containing from 2 to 10 carbon atoms and their amideforming derivatives and the super polyamides made by the intramolecular polymerization of omega-aminos as containing from 4 to 12 carbon atoms and their amide-forming derivatives, such as polyhexamethylene-adipamide, polyhexamethylenesebacamide, and polycaprolactam, polycarbonimides, polyethers, polycarbonates and polyoxyalkylenes, such as high molecular weight, thermally stable polyoxymethylene.

Typical thermoplastic or heat-sealing adhesives used in combination with polyethylene terephthalate include polyethylene and copolymers thereof such as an ethylene-ethyl acrylate copolymer. Most preferred adhesives include polyethylene itself or its interpolymers.

As provided by the present invention, a laminated identification card and/or photograph substantially free of any bubble formation thereon can be made simply and economically. And, in addition to providing a laminated identification card in which the identifying subject matter is not distorted or altered, the present invention provides an identification card wherein the identifying information is fully protected.

It will be clear that variations may be made in the present method without departing from the scope of the present invention. For example, films 12 and 16 may be two separate strips of film. In such case, the films would be tacked together, e.g., along their left-hand edges to provide a standard pouch to insert the release paper 20 to texturize the heat-sealing adhesive surfaces of the films prior to being laminated to an insert. It is my intention, accordingly, that the scope of the invention be limited solely to that of the hereinafter appended claims.

I claim as my invention:

1. A method of producing a substantially bubble-free laminate of plastic film for identification cards, photographs and the like, which method comprises impressing a texture of plural pathways in the heat-sealing surface of a plastic laminate film, and laminating subsequently said identification card to said plastic film.

2. A method according to claim 1 wherein said plastic laminate film is polyethylene terephthalate.

3. A method according to claim 1, wherein the heat-sealing surface is polyethylene.

4. A method according to claim 1, wherein the heat-sealing surface is an ethylene-ethyl acrylate copolymer.

5. A method according to claim 1, wherein the heat-sealing surface of said film is texturized by placing a release paper against the heat-sealing surface of said film, and applying a sufficient amount of pressure to the film and paper to impress the texture of the release paper into the heat-sealing surface of the film.

6. A method according to claim 5, wherein heat is applied in combination with the pressure to the film and release paper to impress the texture of the paper into the heat-sealing surface of the film.

7. A method according to claim 5, wherein the texture impressed into said heat-sealing surface is a pattern of pathways.

8. A method of producing a substantially bubble-free laminate of plastic film for identification cards, photographs and the like, said method comprises: (a) placing a release paper against the heat-sealing surface of said plastic film; (b) applying a sufficient amount of heat and pressure to the film and paper to impress the texture of the release paper into the heat-sealing surface of the plastic film, and replacing the release paper with said identification card; and (c) laminating said identification card to said plastic film.

9. A method according to claim 8, wherein said plastic film is polyethylene terephthalate and said heat-sealing surface is polyethylene.

10. A method according to claim 8, wherein the texture impressed into said heat-sealing surface is a pattern of pathways.

* * * * *